United States Patent [19]

Laustsen et al.

[11] Patent Number: 4,714,664

[45] Date of Patent: Dec. 22, 1987

[54] ELECTRICAL BATTERY

[75] Inventors: Mads A. Laustsen, Valby; Karen Kümmel, Lyngby, both of Denmark

[73] Assignee: A/S Hellesens, Køge, Denmark

[21] Appl. No.: 868,796

[22] Filed: May 29, 1986

[30] Foreign Application Priority Data

Jun. 17, 1985 [DK] Denmark ............................. 2732/85

[51] Int. Cl.$^4$ ............................................... H01M 6/14
[52] U.S. Cl. .................................... 429/105; 429/197; 429/198
[58] Field of Search ............... 429/196, 197, 192, 198, 429/199, 105, 42

[56] References Cited

U.S. PATENT DOCUMENTS

| | | | |
|---|---|---|---|
| 3,592,696 | 7/1971 | Palmer | 429/42 |
| 3,879,223 | 4/1975 | Farrington et al. | 429/192 |
| 4,184,014 | 1/1980 | Dey | 429/196 |
| 4,307,160 | 12/1981 | Shipman et al. | 429/105 |
| 4,547,441 | 10/1985 | Vallin et al. | 429/196 |
| 4,579,795 | 4/1986 | Gray | 429/197 |

FOREIGN PATENT DOCUMENTS

| | | |
|---|---|---|
| 2639121 | 9/1975 | Fed. Rep. of Germany . |
| 2445032 | 7/1980 | France . |
| 2445033 | 7/1980 | France . |

*Primary Examiner*—John F. Niebling
*Assistant Examiner*—Steven P. Marquis
*Attorney, Agent, or Firm*—Scully, Scott, Murphy & Presser

[57] ABSTRACT

An electrical battery with a non-aqueous electrolyte comprising thionyl chloride or sulfuryl chloride and a metal salt dissolved therein and with an anode of a metal from group 1 or 2 in the Periodic Table or alloys of these has reduced delays action (D.A.) when the electrolyte contains a $SO_3$ compound.

2 Claims, 3 Drawing Figures

ELECTRICAL BATTERY

FIELD OF THE INVENTION

The present invention concerns an electrical battery with a non-aqueous electrolyte/cathode comprising thionyl chloride or sulfuryl chloride and a metal salt dissolved therein and with an anode of a metal from group 1 or 2 of the Periodic Table or alloys of these.

A typical battery of this type is the so-called lithium battery in which the electrolyte/cathode is thionyl chloride or sulfuryl chloride with lithium aluminium chloride ($LiAlCl_4$) dissolved therein and in which the anode is lithium.

DESCRIPTION OF THE PRIOR ART

Batteries of this kind have the drawback that during storage the anode metal builds of a passivating layer on the surface which causes so-called delayed action (DA), i.e. poor load carrying capacity of the battery at start. Many attempts have been made to solve this problem but none has been able to eliminate delayed action without either increasing the self discharge or the costs considerably. The experiments have concentrated on batteries in which the anode is lithium, and they will in the following be mentioned in connection with such battery, but in principle the problem is the same when the anode is one of the other metals from group 1 or 2 of the Periodic Table or alloys of these which are placed high in the electromotive series seeing that delayed action is due to the formation on the surface of the anode of a layer of metal chloride which prevents the voltage producing reaction between the anode and the thionyl chloride or sulfuryl chloride from starting. This layer of metal chloride grows in the course of time and if the battery has been stored for a very long time it may be so great that the battery is useless.

An attempt to solve the problem was to have the electrolyte contain sulfur dioxide ($SO_2$) which has provided a good effect, both with electrolytes which are saturated and electrolytes which are unsaturated with lithium chloride (LiCl), but the effect maintains only at room temperature because the addition of $SO_2$ causes irreversible passivation if the battery is exposed to temperatures higher than about 40° C. Besides, the self discharge is considerably increased. A second attempt was to replace the traditionally used salt $LiAlCl_4$ with the salts $Li_2B_{10}Cl_{10}$ and $Li_2B_{12}Cl_{12}$. Such change of the electrolute gives rise to DA improvements but increase the costs of electrolyte considerably and gives a less stable and more poorly load carrying electrolyte.

A third attempt was to replace the salt $LiAlCl_4$ with the reaction product between $NbCl_5$ and $Li_2S$ or $Li_2O$. This also results in improvements of the DA properties of the battery, but so far it has only been ascertained in batteries which have been stored for a short period, the attempt being of a recent date.

Other additions to electrolytes which have turned out to provide DA improvements are additions of the salts $SbCl_5$ and $GaCl_4$. However, they do not in themselves give a satisfactory solution to the DA problem.

Finally, attempts have been made with coating of the lithium anode but this method is troublesome and not very efficient.

Thus, there is a need for an electrical battery of the kind here in question which is free from the delayed action problem and which does not have the drawbacks of poor load carrying capacity or self discharge either.

SUMMARY OF THE INVENTION

Such battery is provided by the present invention, and it is characterized in that the electrolyte contains an added $SO_3$ compound.

Especially efficient $SO_3$ compounds turn out to be $SO_3$ complexes like e.g. $C_5H_5N:SO_3$. This may possibly be due to the fact that stabilized $SO_3$ is stable in the electrolyte whereas electrolyte with added pure $SO_3$ is so active that the $SO_3$ by long term storage will react with either $SOCl_2$, $SO_2Cl_2$ or with lithium for which reason the effect is lowered.

An especially advantageous effect is obtained when the electrolyte/cathode in addition contains up to 0.40M $LiNbCl_6$ or $LiTaCl_6$ because these compounds reduce the self discharge of the cells without effecting the obtained DA improvements. A likely explanation of this may be that $LiNbCl_6$ or $LiTaCl_6$ form a stable lithium ion conducting passivation layer on lithium. When the LiCl growth on this passivation layer at the same time is prevented by the addition of $SO_3$ compounds a dual effect is obtained where the cells have very low self discharge at the same time as they are largely free from DA.

BRIEF DESCRIPTION OF THE DRAWINGS

FIGS. 1 and 2 illustrate results of delayed action measurements on the cells of Example 1, wherein FIG. 1 shows the measurements after storage for two weeks at 45° C., and FIG. 2 shows the measurements after storage for two weeks at 70° C.

DETAILED DESCRIPTION OF THE INVENTION

EXAMPLES

The invention is illustrated by the following examples in connection with the drawings.

Example 1

Some cells were prepared with lithium as the anode thionyl chloride as the active cathode with 1.8M $LiAlCl_4$ dissolved therein, and carbon as the current collector.

In addition the following compounds were added to the thionyl chloride:
1. None (standard cell)
2. 0.16M $LiSO_3Cl$
3. 0.17M $SO_3$
4. 0.11M $C_5H_5N:SO_3$
5. 0.11M $C_5H_5N:SO_3$+0.09M $LiNbCl_6$ The cells were then stored for 2 weeks at 45° C. and 2 weeks at 70° whereafter their DA and capacity were measured.

Figure 1:
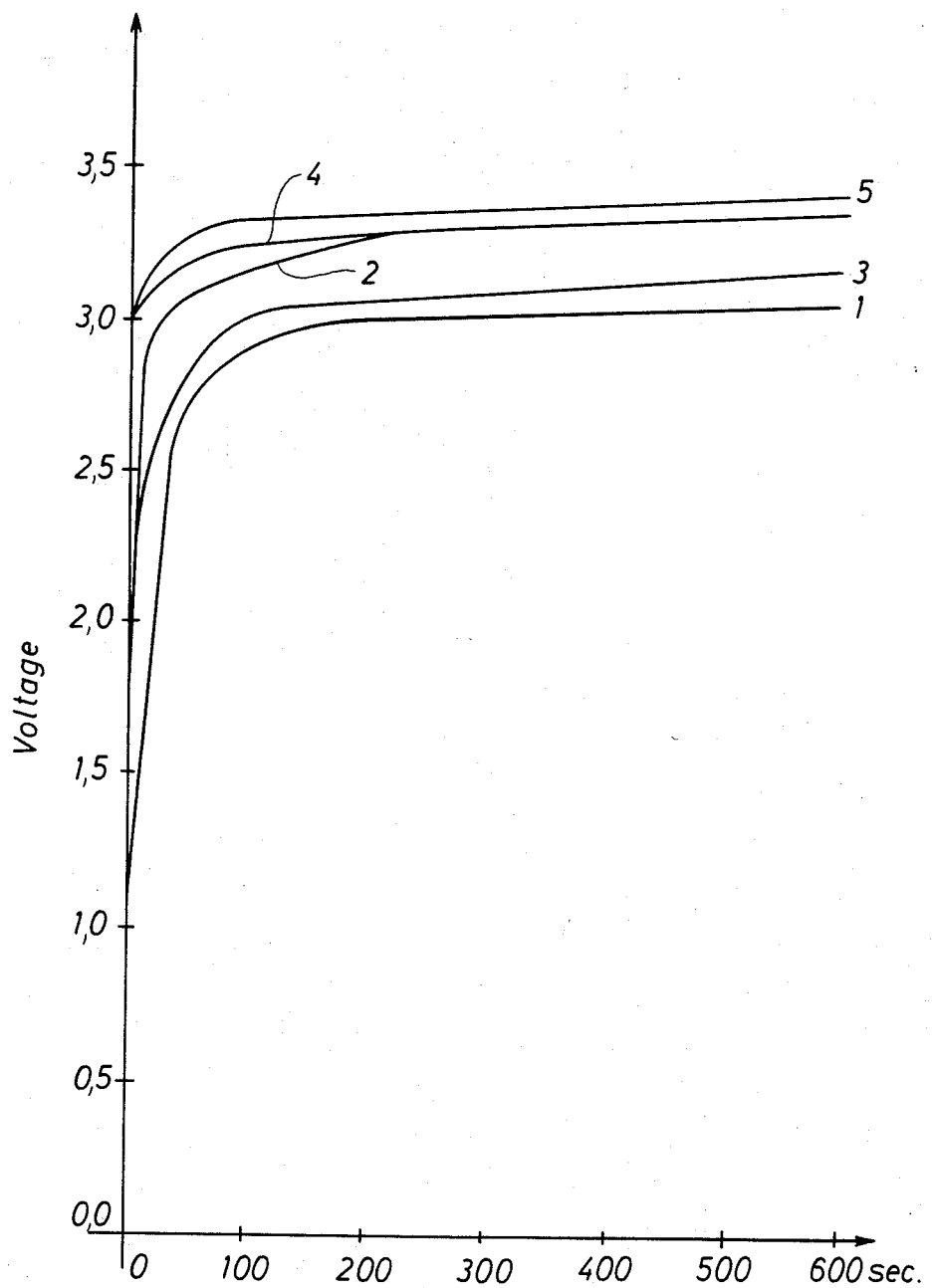
Figure 2:
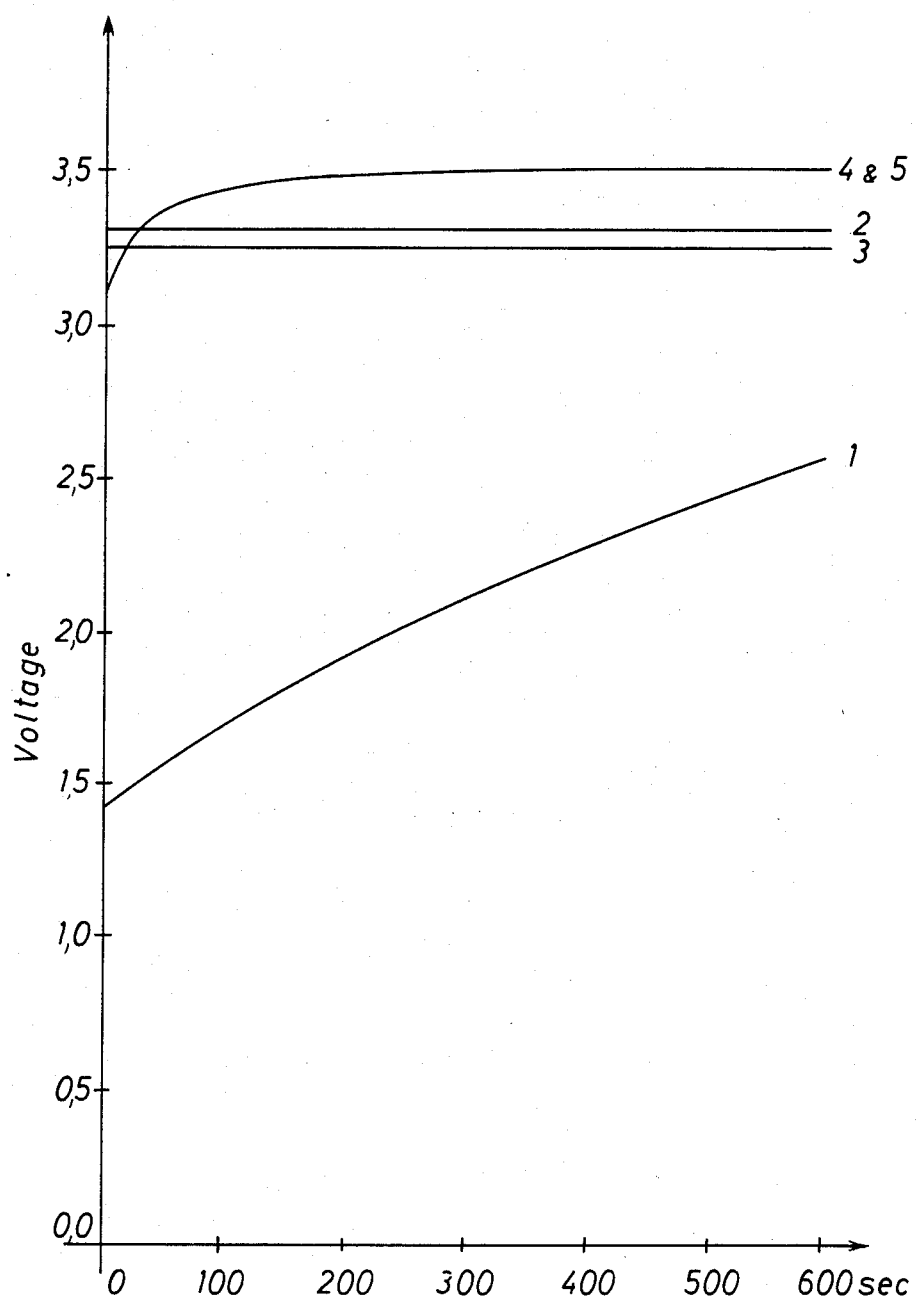

The results of the DA measuring can be seen from FIGS. 1 and 2 where FIG. 1 shows the results after 2 weeks at 45° C. and FIG. 2 the results after 2 weeks at 70° C.

| Electrolyte | Capacity | |
| --- | --- | --- |
| | Storage at 45° C. | Storage at 70° C. |
| 1 | 5.78 | 5.13 |

| Electrolyte | Capacity Storage at 45° C. | Storage at 70° C. |
| --- | --- | --- |
| 2 | 5.90 | 5.08 |
| 3 | 5.68 | 4.88 |
| 4 | 5.77 | 5.73 |
| 5 | 6.22 | 6.00 |

Example 2

6 cells were prepared with lithium as the anode, thionyl chloride as the active cathode with 1.8M $LiAlCl_4$ dissolved therein, and carbon as the current collector.

To 2 of these cells were also added 0.11M $C_5H_5N:SO_3$, and to other 2 was added 0.11M $C_5H_5N:SO_3$ and 0.10M $LiNbCl_6$.

The cells were then stored for 6 months at 45° C. whereafter their DA and capacity were determined.

Figure 3:
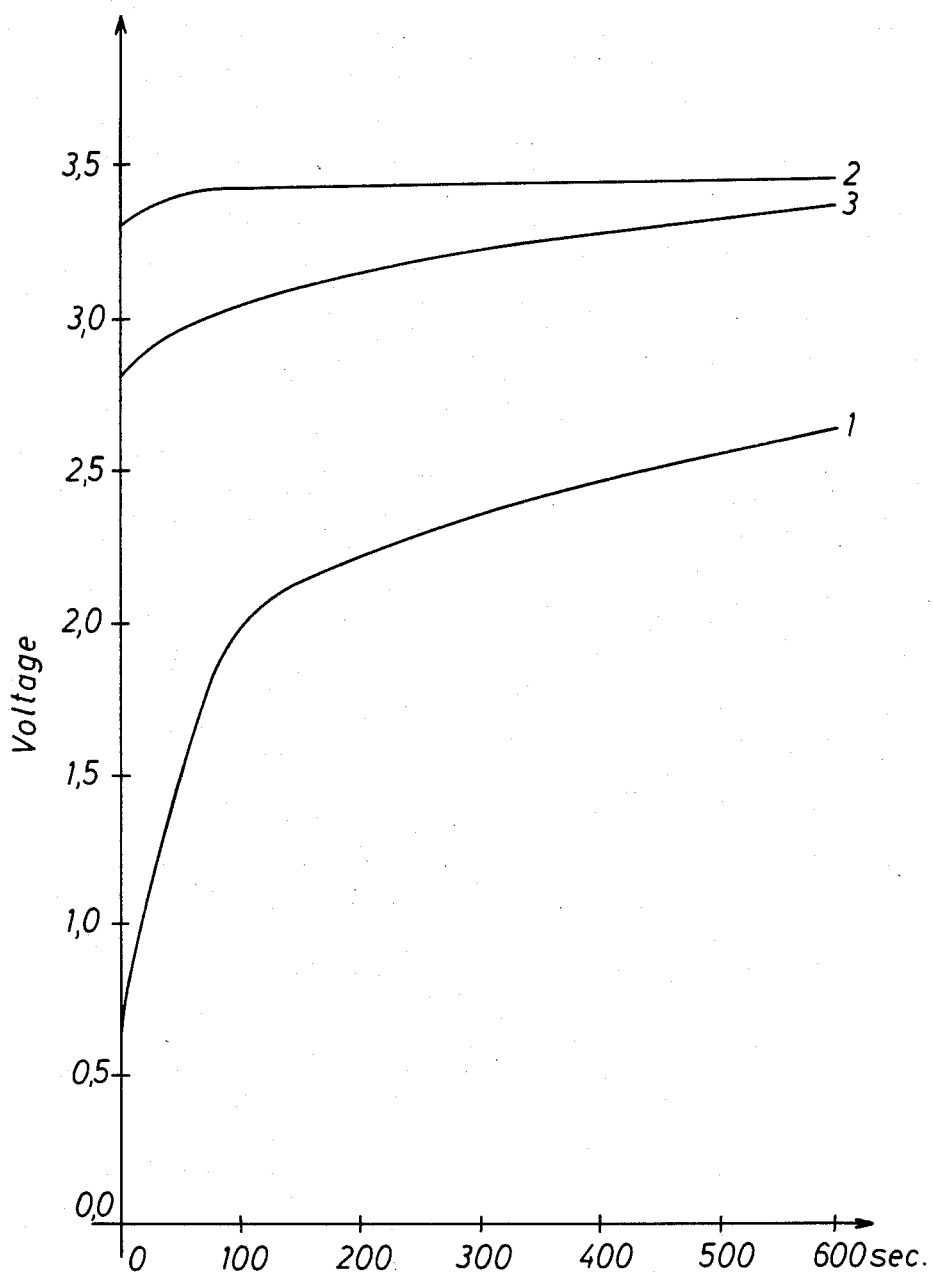
FIG. 3 illustrates results of delayed action measurements on the cells of Example 2 after storage for six months at 45° C.

FIG. 3 shows the result of the DA measuring, the graph numbers corresponding to the following electrolyte compositions:

1. Standard
2. Standard + 0.11M $C_5H_5N:SO_3$
3. Standard + 0.11M $C_5H_5N:SO_3$ + 0.10M $LiNbCl_6$

| Electrolyte | Capacity |
| --- | --- |
| 1 | 5.50 ± 0.15 |
| 2 | 5.37 ± 0.20 |
| 3 | 5.84 ± 0.10 |

We claim:

1. An electrical battery with a non-aqueous electrolyte/cathode comprising thionyl chloride or sulfuryl chloride and a metal salt dissolved therein and with an anode of metal from group 1 or 2 of the Periodic Table or alloys of these, characterized in that the electrolyte contains the added stabilized $SO_3$ compound $C_5H_5N:SO_3$ (pyridine sulfer trioxide) in an amount effective to improve the delayed action properties of the electrical battery.

2. An electrical battery as claimed in claim 1, characterized in that 0.1–0.40M $SO_3$ or $C_5H_5N:SO_3$ has been added to the electrolyte.

* * * * *